(12) United States Patent
Shy

(10) Patent No.: US 6,215,273 B1
(45) Date of Patent: Apr. 10, 2001

(54) PORTABLE ELECTRICAL ENERGY SOURCE

(76) Inventor: Jack Shy, 7F, No. 46, Pin Ho 10 Street, Chang Hua (TW), 500

( * ) Notice: Subject to any disclaimer, the term of this patent is extended or adjusted under 35 U.S.C. 154(b) by 0 days.

(21) Appl. No.: 09/533,577

(22) Filed: Mar. 23, 2000

(51) Int. Cl.$^7$ .................................................. H02M 10/46
(52) U.S. Cl. ............................................................ 320/105
(58) Field of Search ..................................... 320/105, 112, 320/107, 104, 111, 114

(56) References Cited

U.S. PATENT DOCUMENTS

| | | | |
|---|---|---|---|
| 4,885,524 | * 12/1989 | Wilburn | 320/105 |
| 5,214,368 | * 5/1993 | Wells | 320/105 |
| 5,367,243 | * 11/1994 | Wells et al. | 320/105 |
| 5,635,817 | * 6/1997 | Shiska | 320/105 |
| 5,982,138 | * 11/1999 | Krieger | 320/105 |

\* cited by examiner

*Primary Examiner*—Edward H. Tso

(57) ABSTRACT

A portable electrical energy source includes a housing having a chamber for receiving one or more batteries. A casing is detachably secured to the housing for retaining the batteries in the housing. A pair of clips are received in the casing and coupled to the battery for coupling to the battery of the other vehicle and for jumping the vehicle. The casing has one or more hooks engaged with the housing and a latch for detachably securing the casing to the housing. A light device may be attached to the housing and coupled to the battery for lighting purposes.

1 Claim, 5 Drawing Sheets

PORTABLE ELECTRICAL ENERGY SOURCE

BACKGROUND OF THE INVENTION

1. Field of the Invention

The present invention relates to an electric power supply device, and more particularly to a portable electrical energy source.

2. Description of the Prior Art

Typically, the battery of a vehicle may be coupled to the battery of the other vehicle for jumping the other vehicle. When the vehicles are computerized, the computer systems of both the vehicles may be damaged during the jumping operation. In addition, it is inconvenient to electrically couple the batteries of the vehicles together.

The present invention has arisen to mitigate and/or obviate the afore-described disadvantages of the conventional electric power supply devices.

SUMMARY OF THE INVENTION

The primary objective of the present invention is to provide a portable electrical energy source for supplying the electric power to jump the vehicle.

In accordance with one aspect of the invention, there is provided a portable electrical energy source comprising a housing including a chamber formed therein, at least one battery received in the chamber of the housing, a casing including an opening formed therein, a pair of clips received in the opening of the casing, means for coupling the clips to the battery, and means for detachably securing the casing to the housing to retain the at least one battery in the housing. The battery and the casing may be easily and quickly disengaged from the housing and may be coupled to the battery of the other vehicle for jumping the vehicle.

The casing includes a pair of rods extended inward of the opening of the casing for engaging with the clips. The detachably securing means includes a latch extended from the casing for engaging with the housing and for securing the casing to the housing, and includes at least one hook extended from a bottom portion of the casing for engaging with the housing and for securing the casing to the housing.

The housing includes a stop extended inward of the chamber of the housing for engaging with the at least one battery and for retaining the at least one battery in the housing. The housing includes a pair of conductors secured in the housing, the at least one battery includes a pair of poles and a pair of conductors secured to the poles of the at least one battery and electrically coupled to the conductors of the housing. A light device is further electrically coupled to the conductors of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
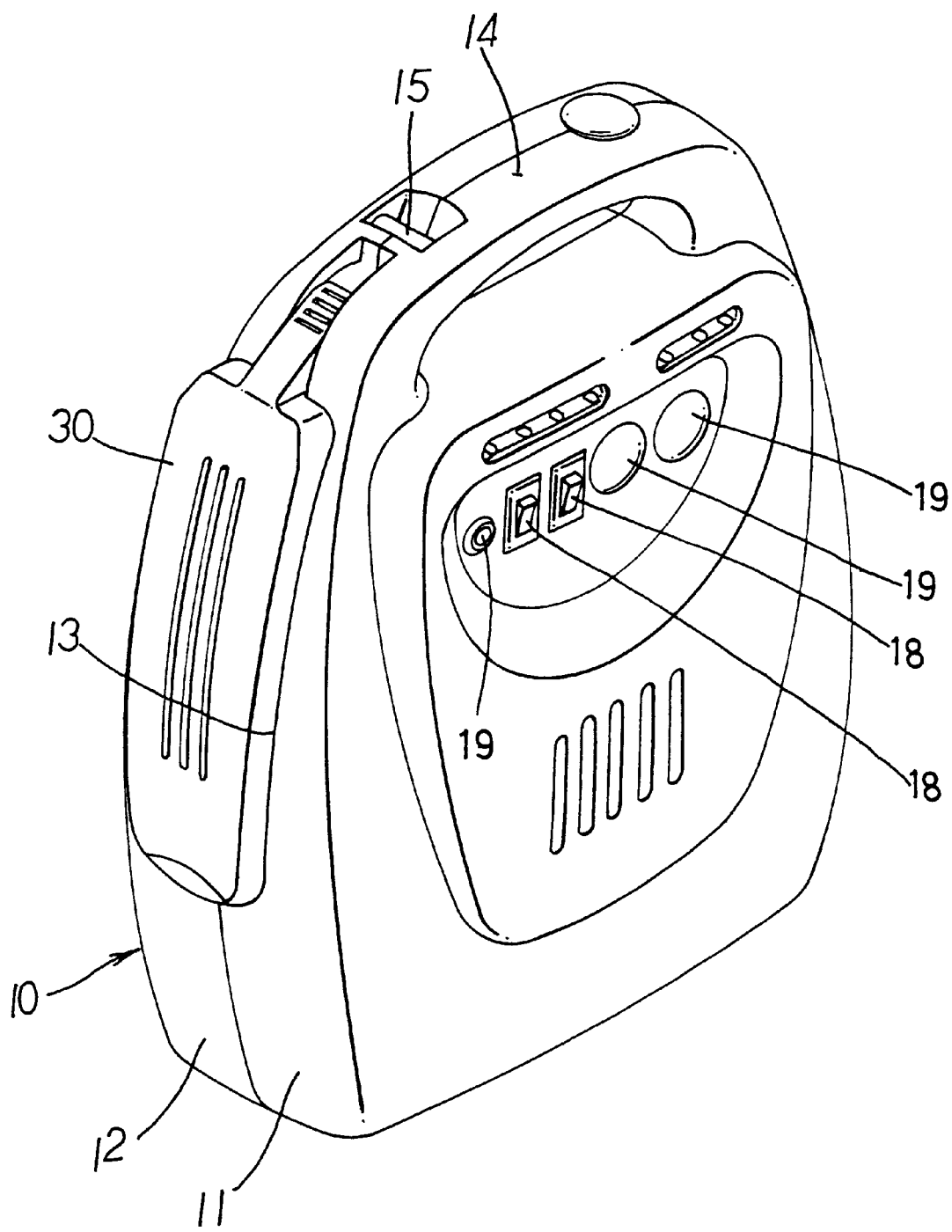
FIG. 1 is a perspective view of a portable electrical energy source in accordance with the present invention.

Referring to the drawings, and initially to FIGS. 1–6, a portable electrical energy source in accordance with the present invention comprises a housing 10 including two members 11, 12 secured together by such as the fasteners 17. The housing 10 includes a chamber 121 formed in the rear portion thereof for receiving one or more batteries 50, and includes a recess 13 (FIG. 1) formed in one side portion thereof for receiving a light device 30 which is pivotally secured to the housing 10 at a pivot pin 31 (FIG. 4) and which includes one or more light bulbs or light tubes 32 disposed therein. The housing 10 includes a hand grip 14 provided on top thereof for carrying purposes, and includes a pair of studs 15 provided on top thereof for engaging with a carrying strap, for example. The housing 10 includes a front portion having one or more switches 18 provided thereon for controlling the light device 30 or the other electric devices, and having one or more sockets 19 provided therein for coupling to or for plugging to the other electric facilities.

Figure 8:
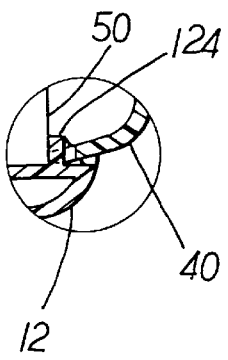
Figures 5, 6:
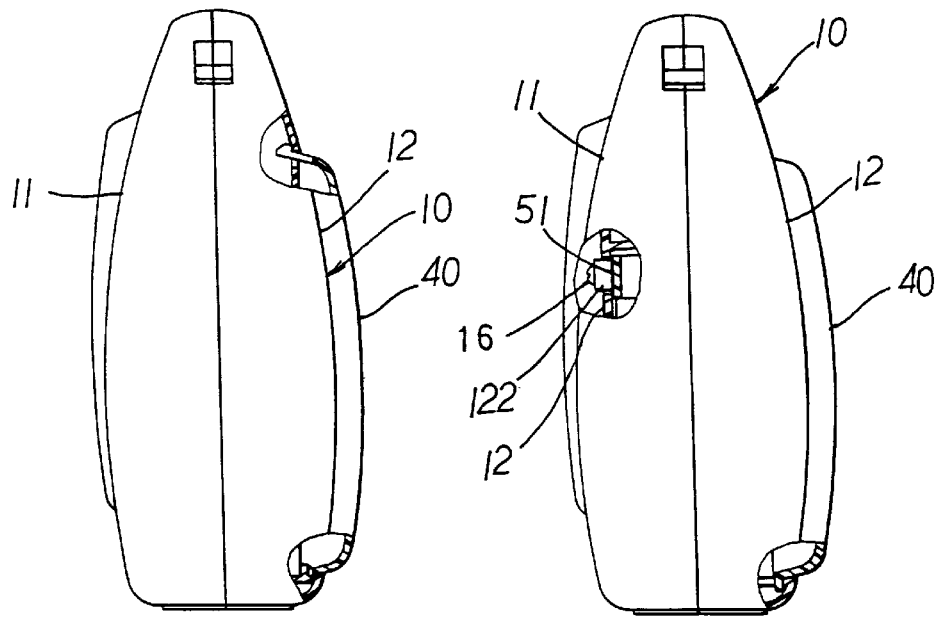
FIGS. 5 and 6 are side views of the portable electrical energy source.

One or more, particularly a pair of conductors 122 are received in the chamber 121 of the housing 10 and secured to the housing 10 with fasteners 16 (FIG. 6). The housing 10 includes a stop 124 provided in the rear portion or extended upward from the bottom thereof and extended inward of the chamber 121 of the housing 10 for engaging with the battery 50 (FIGS. 5, 8) and for stably retaining the battery 50 within the housing 10. The housing 10 includes a cavity 123 formed in the rear portion thereof (FIGS. 2, 3), and includes one or more recesses 125 formed in the bottom portion thereof and communicating with the chamber 121 of the housing 10.

Figure 7:
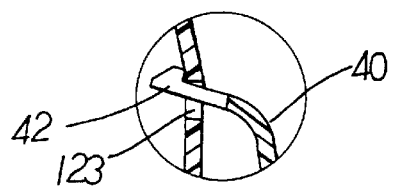
FIGS. 7, 8, 9 are cross sectional views taken along lines 7—7, 8—8, 9—9 of FIG. 4 respectively.
Figure 9:
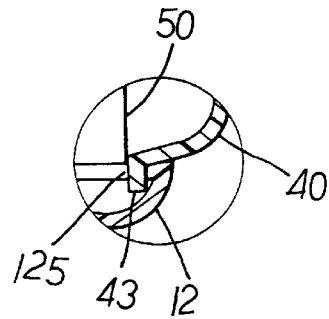

A casing 40 includes a front portion 41 engaged with the rear portion of the housing 10 and includes one or more catches 43 extended downward therefrom for engaging with the recesses 125 of the housing 10 (FIGS. 6, 9), and includes a resilient latch 42 provided on top thereof for engaging with the cavity 123 of the housing 10 (FIGS. 5, 7) and for securing the casing 40 to the housing 10. The casing 40 may engage with the battery 50 for stably securing and retaining the battery 50 within the housing 10. The latch 42 may be disengaged from the cavity 123 of the housing 10 by depressing the latch 42, such that the battery 50 and the casing 40 may be easily disengaged from the housing 10.

The casing 40 includes a rear portion having an opening 44 formed therein and having a pair of rods 45 extended inward of the opening 44 of the casing 40. A pair of clips 46 may be received in the opening 44 of the casing 40 and may be engaged with the rods 45 (FIG. 2) for securing the clips 46 within the casing 40. Two cables 47 are extended through the casing 40 and have one ends coupled to the respective clips 46, and have the other ends coupled to the electric poles of the battery 50. The clips 46 may thus be engaged with or coupled to the battery of the vehicles for easily jumping the vehicles. Two conductors 51 are also coupled to the battery 50 and engaged with the conductors 122 (FIG. 6) for electrically coupling the light device 30 and/or the sockets 19 and/or the switches 18 to the battery 50.

Figure 2:
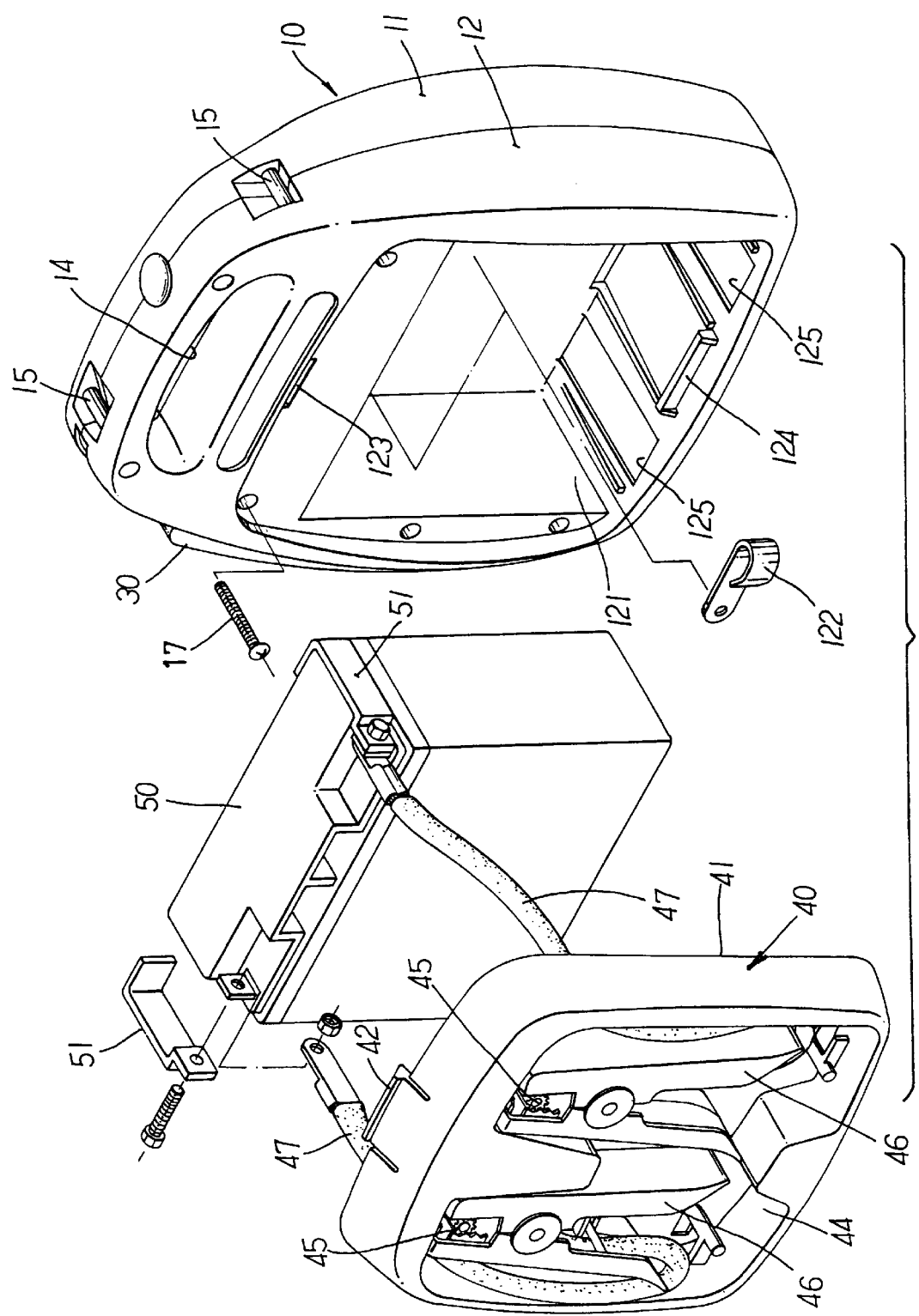
FIG. 2 is an exploded view of the portable electrical energy source.
Figure 3:
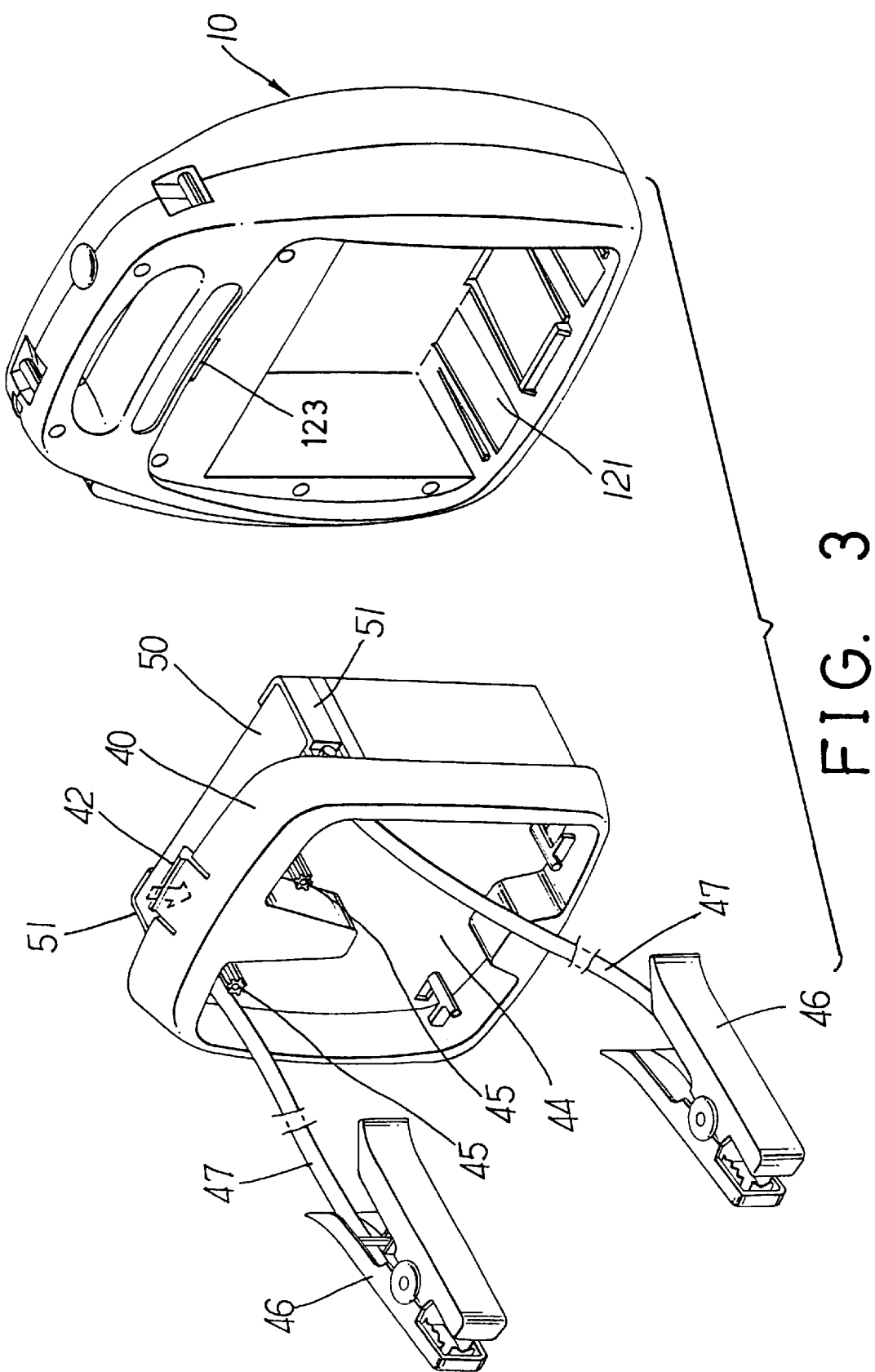
FIG. 3 is a partial exploded view of the portable electrical energy source.
Figure 4:
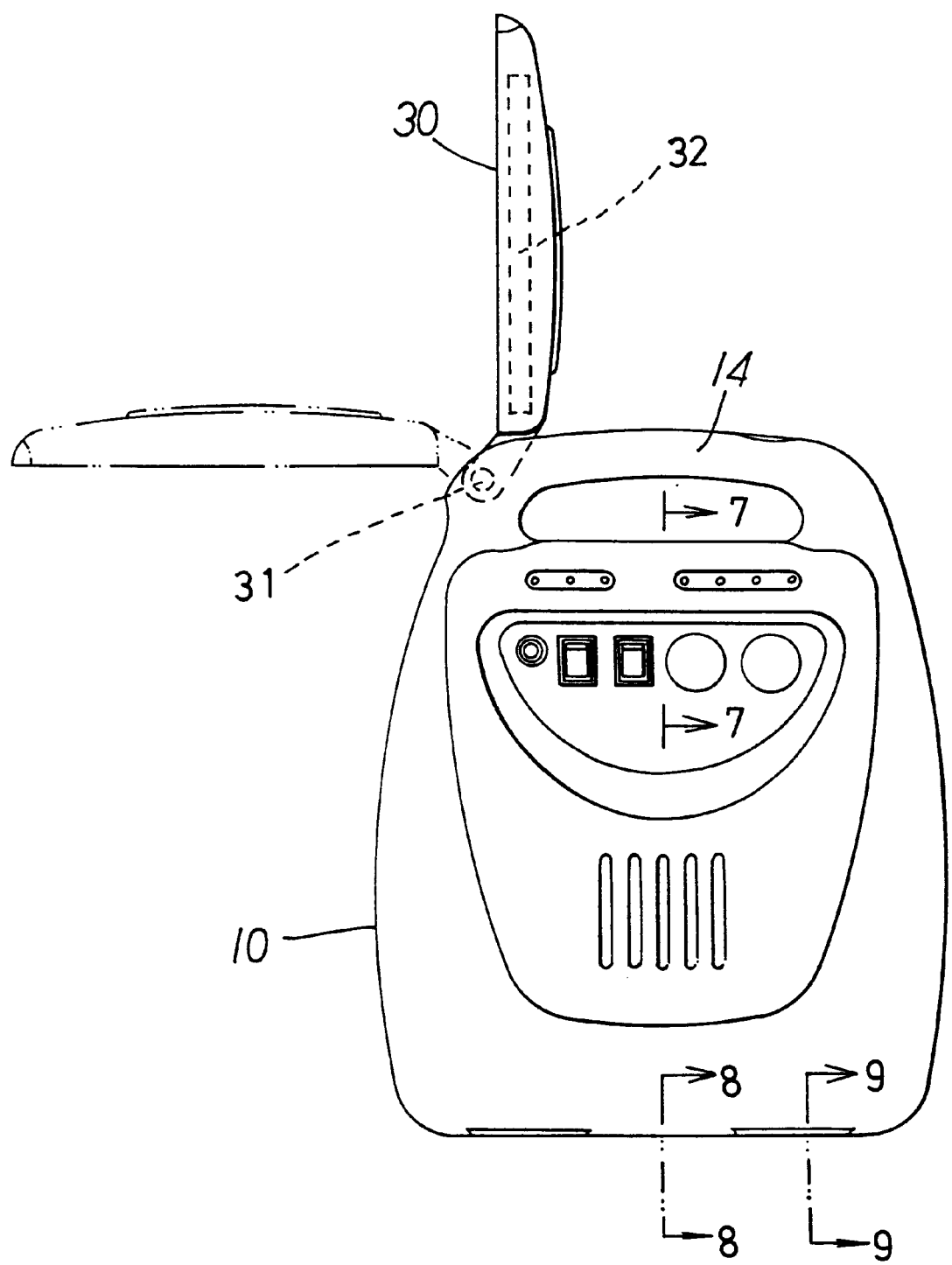
FIG. 4 is a front view of the portable electrical energy source.

In operation, as shown in FIG. 2, the battery 50 and the casing 40 may be disengaged from the housing 10 by disengaging the latch 42 from the housing 10, such that the clips 46 may be easily coupled to the battery of the vehicle for jumping the vehicle. The light device 30 may be controlled by the switch 18 to light the working environment.

Accordingly, the portable electrical source in accordance with the present invention may be used for supplying the electric power to jump the vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An auxiliary power supply facility comprising:
   a) a housing including a chamber formed therein, said housing including a stop extended inward of said chamber of said housing, and said housing including a pair of conductors secured in said housing,
   b) at least one battery received in said chamber of said housing, said stop of said housing being engaged with said at least one battery for retaining said at least one battery in said housing, said at least one battery including a pair of poles and a pair of conductors secured to said poles of said at least one battery and electrically coupled to said conductors of said housing respectively,
   c) a casing including an opening formed therein, said casing including a bottom portion having at least one catch extended therefrom for engaging with said housing and for securing said casing to said housing, said casing including a latch extended therefrom for engaging with said housing and for detachably securing said casing to said housing,
   d) a pair of clips received in said opening of said casing,
   e) means for coupling said clips to said at least one battery, and
   f) a light device electrically coupled to said conductors of said housing and to be energized by said at least one battery.

* * * * *